United States Patent
Wang et al.

(10) Patent No.: US 6,715,040 B2
(45) Date of Patent: Mar. 30, 2004

(54) PERFORMANCE IMPROVEMENT OF A WRITE INSTRUCTION OF A NON-INCLUSIVE HIERARCHICAL CACHE MEMORY UNIT

(75) Inventors: Jin Chin Wang, Union City, CA (US); Maciek P. Kozyrczak, Bellevue, WA (US)

(73) Assignee: NEC Electronics, Inc., Santa Clara, CA (US)

(*) Notice: Subject to any disclaimer, the term of this patent is extended or adjusted under 35 U.S.C. 154(b) by 0 days.

(21) Appl. No.: 10/041,932

(22) Filed: Jan. 7, 2002

(65) Prior Publication Data

US 2002/0174304 A1 Nov. 21, 2002

Related U.S. Application Data

(60) Provisional application No. 60/260,100, filed on Jan. 5, 2001.

(51) Int. Cl.[7] .............................................. G06F 12/00
(52) U.S. Cl. ........................ 711/133; 711/141; 711/159
(58) Field of Search ................................ 711/122, 133, 711/141, 159, 165

(56) References Cited

U.S. PATENT DOCUMENTS

| 5,537,573 A | * | 7/1996 | Ware et al. ................. 711/137 |
| 5,564,035 A | * | 10/1996 | Lai ............................ 711/144 |
| 5,787,478 A | * | 7/1998 | Hicks et al. ................ 711/141 |
| 5,809,526 A | * | 9/1998 | Patel ......................... 711/122 |
| 5,963,978 A | * | 10/1999 | Feiste ........................ 711/158 |
| 6,401,173 B1 | * | 6/2002 | Razdan et al. ............. 711/141 |

* cited by examiner

Primary Examiner—Donald Sparks
Assistant Examiner—Christian P. Chace
(74) Attorney, Agent, or Firm—Skjerven Morrill LLP (57) ABSTRACT

Described is a data processing system including a processor, a plurality of caches, and main memory, the secondary caches being implemented as being non-inclusive, i.e., the lower order caches not storing a superset of the data stored in the next higher order cache. The non-inclusive cache structure provides increased flexibility in the storage of data. The operation of a write request operation when the target data line is not found in the primary cache. By using the dirty bit associated with each data line, the interaction between the processor and the primary cache can be reduced. By using the invalidity bit associated with each data line, the interaction between the processor and the primary cache can be reduced.

7 Claims, 8 Drawing Sheets

PERFORMANCE IMPROVEMENT OF A WRITE INSTRUCTION OF A NON-INCLUSIVE HIERARCHICAL CACHE MEMORY UNIT

CROSS REFERENCE TO RELATED APPLICATIONS

This application claims priority to co-pending provisional U.S. patent application Ser. No. 60/260,100, filed on Jan. 5, 2001, entitled "Performance Improvement of a Write Instruction of a Non-Inclusive Hierarchical Cache Memory Unit" naming J. C. Wang and Maciek P Kozyrzak as inventors and assigned to the same assignee as this application, the application being incorporated herein by reference in its entirety.

This application relates to co-pending U.S. patent application Ser. No. 09/965,709, filed on Sep. 26, 2001, entitled "Performance Improvement of a Read Instruction of a Non-Inclusive Hierarchical Cache Memory Unit" naming J. C. Wang and Maciek P. Kozyrczak as inventors and assigned to the same assignee as this application, the application being incorporated herein by reference in its entirety.

This application relates to co-pending U.S. patent application Ser. No. 09/965,705, filed on Sep. 26, 2001, entitled "Performance Improvement of Write-Back and Write-Through Instructions of a Non-Inclusive Hierarchial Cache Memory Unit" naming J. C. Wang and Maciek P. Kozyrczak as inventors and assigned to the same assignee as this application, the application being incorporated herein by reference in its entirety.

BACKGROUND OF THE INVENTION

The present invention relates to data processing systems having cache memory units, and, more particularly, to the operation of a write request in a microprocessor unit with a memory hierarchy.

DESCRIPTION OF THE RELATED ART

Microprocessor units and systems that use microprocessor units have attained wide-spread use throughout many industries. A goal of any microprocessor system is to process information quickly. One technique that increases the speed with which the microprocessor system processes information is to provide the microprocessor system with an architecture which includes a fast local memory called a cache.

A cache is used by the microprocessor system to store temporarily instructions and data. A cache that stores both instructions and data is referred to as a unified cache; a cache that stores only instructions is an instruction cache and a cache that stores only data is a data cache. Providing a microprocessor architecture with a unified instruction and data cache or with an instruction cache and a data cache is a matter of design choice. Both data and instructions are represented by data signal groups. In the following discussion, both instruction signal groups and data signal groups will be referred to as data groups or simply as data. More specifically, data in memory units are stored in data lines, each data line having a plurality of sets of data. The sets of data can be bytes (8 bits) of logic signals or words (16 bits) of data.

A number of characteristics describe the function and operation of the cache. These characteristics include where a block of data can be placed in the cache, how a block of data can be found or accessed when the block is in the cache, which block of data should be replaced on a cache miss, and what happens when a write operation that stores data in a cache.

Three categories describe where a block of data (i.e., line of data) can be stored in a cache; a fully associative cache, a set associative cache, and a direct mapped cache. In a fully associative cache, a block of data can be stored anywhere in the cache. In a set associative cache, a block of data can be placed in a restricted set of places in the cache. In the cache architecture, the set is a group of two or more blocks in the cache. A block of data is mapped onto a set and then the block can be stored anywhere within the set. When there are n blocks in a set, the cache is referred to as an n-way set associative cache. With a direct mapped cache, each block of data has only one place in which it may be stored. The mapping in a direct mapped cache is usually related to the address of the block frame. With a direct mapped cache, each block of data has only one place in which it may be stored in the cache. The mapping in a direct mapped cache is usually related to the address of the block frame.

In a set associative cache, a block of data can be placed in a restricted set of places in the cache. (A set is a group of two or more blocks in the cache.) A block of data is mapped onto a set and then the block can be stored anywhere within the set. When there are n blocks in a set, the cache is referred to as an n-way set associative cache. In a set associative design, the address is split into the equivalent of a prefix and a suffix at a location determined by the size and architecture of the cache. The set-associative approach takes advantage of this spatial locality by placing sequential instructions, not at entirely random cache locations, but at sequential locations. A set-associative cache is constrained; the lower order address bits of the cache location must match the lower order address bits of the matching main memory address.

Those familiar with the design of a cache will be familiar with the organization of a cache in which each storage location has a tag field associated therewith and stored in the cache. Each data group has at least an address associated therewith. A portion of the address determines a location of an associated data group and the remaining portion of the address is contained, along with other data fields, in the tag field. Typically, an address of a required data group, when applied to a cache accesses a memory location storing the data and a memory location storing a tag field the locations being determined by a first portion of the applied address. The tag field is compared with a second portion of the applied address and when the two fields are the same, the data in the accessed location is the data associated with the applied address (i.e., commonly referred to as a cache hit). When a cache hit occurs, the cache can supply a copy of the data in the main memory location.

The tag field can include fields that determine whether the data associated with the address (i.e., both the first and second portions) is valid. The tag field can also indicate whether the data associated with the complete address has been modified, a modified data group frequently being referred to as a "dirty" data group or a "dirty bit". In addition, the data stored in the cache typically has a plurality of data sequential groups increments, e.g., a plurality of words, for a given address. For purposes of retrieving data from a cache, the plurality of neighboring data groups, also referred to as blocks renders the lowest order address bit(s) redundant.

A cache replacement algorithm determines which data block or data line to replace on a cache write. In a direct mapped cache, there is no need for a replacement algorithm, only one block location (or address) is checked for a hit and only the associated data block is replaced. However, for a fully associative or a set associative cache, the replacement algorithm selects which data block to replace. Two examples of cache replacement algorithms include a random replacement algorithm and a least recently used (LRU) replacement algorithm. With the random replacement algorithm, locations for replacement are randomly selected. With a least recently used replacement algorithm, the block location that is replaced is the block location that has been unused for the longest time.

A cache write policy determines what happens when a write operation occurs to the cache. Two basic options are available when writing to a cache, a write through operation and a write back operation. In a write through operation, the information is written to the block location of the cache as well as to the block location in the lower level memory, typically main memory. In a write or write back operation, the information is written only to the block in the cache. The modified cache block is written to the lower level memory only when the block is replaced. Write back cache blocks are clean or dirty depending on whether the information in the cache differs from that in the lower level memory. To reduce the frequency of writing back blocks on replacement, the dirty bit, which indicates whether or not the block was modified while in the cache, is provided.

As microprocessor architectures have matured, microprocessor systems have been designed that include both a primary (or internal) cache and a secondary (or external) cache. The primary cache is also referred to as a level 1 (L1) cache, while the secondary cache is also referred to as a level 2 (L2) cache. In some microprocessor systems, the microprocessor might include two internal caches which are referred to as a level 0 (L0) cache and a level 1 cache. It should be appreciated that the terminology of the cache designations are meant to refer to a cache level and not necessarily to the cache location. Cache designations may be generalized as a level i cache, a level i+1 cache, a level i+2 cache, etc. The levels denote, in general, the accessibility of the data stored in the cache, the lower the level, the more readily accessible are the blocks stored therein to the microprocessor. A plurality of caches necessarily involves a series of design considerations. For example, each level of memory requires an increasing amount of time to access, the primary (i.e., L0 or L1) cache can typically designed to be accessible in 1 central processing unit cycle, while the main memory can be typically designed to be accessed in times of the order of 100 central processing unit cycles.

A consideration of multilevel cache systems is whether all data in a lower level cache is always included in the next higher level cache. If so, the lower level cache is said to be inclusive. Inclusion allows consistency between the caches to be determined merely by checking the lower level cache. Another consideration of multilevel cache systems is whether to provide the second level cache with higher associativity than the higher level cache.

Whatever cache strategies are chosen, the interaction between the microprocessor and the cache(s) can determine the performance of the data processing system. A need has been felt for a memory hierarchy, which improves the performance of the data processing system. In particular, a write instruction should have the feature or improving the performance of the data processing system.

SUMMARY OF THE INVENTION

The aforementioned and other features are accomplished, according to the present invention, by providing a data processing system having a primary cache and at least a secondary cache memory unit, the cache memory units being non-inclusive as contrasted with inclusive cache memory units. In addition, the tag field in the cache includes a dirty (i.e., modified) bit field. In a write request operation, when the address of the data that is the subject of the write request is found in the primary cache, the data is placed in the data line defined by the address associated with the write operation and the dirty bit is set. When the address associated with the write operation is not found in the primary cache, a determination is made whether an address is available for storing the data line that includes the address of the write request data. When a data line address is available in the primary cache, the procedure examines the lower level caches in order until the primary data line is found. When the primary data line is found, the data address of the cache memory unit in which the data line is found is invalidated and the data line itself is placed in the available cache line address in the primary cache. When the data line address is not found in the cache memory unit, then the data line is retrieved from main memory and stored in the primary cache and the dirty bit is set. When an address is not available for the storage of the write request data, a data line address, referred to as a write back address is selected according to a replacement algorithm. The write back address is then sought in the lower level caches and in main memory. The write back line is then stored in the first available location. The write request data is stored in the primary cache address that has been selected for replacement and that stores the data line associated with that address.

BRIEF DESCRIPTION OF THE DRAWINGS

The present invention may be better understood, and its numerous objects, features, and advantages made apparent to those skilled in the art by referencing the accompanying drawings.

FIG. 1A is a block diagram of data processing system capable of advantageously using the present invention, while FIG. 1B is illustrates the general organization of a multi-level cache hierarchy.

DETAILED DESCRIPTION OF THE DRAWINGS

Figure 1A:
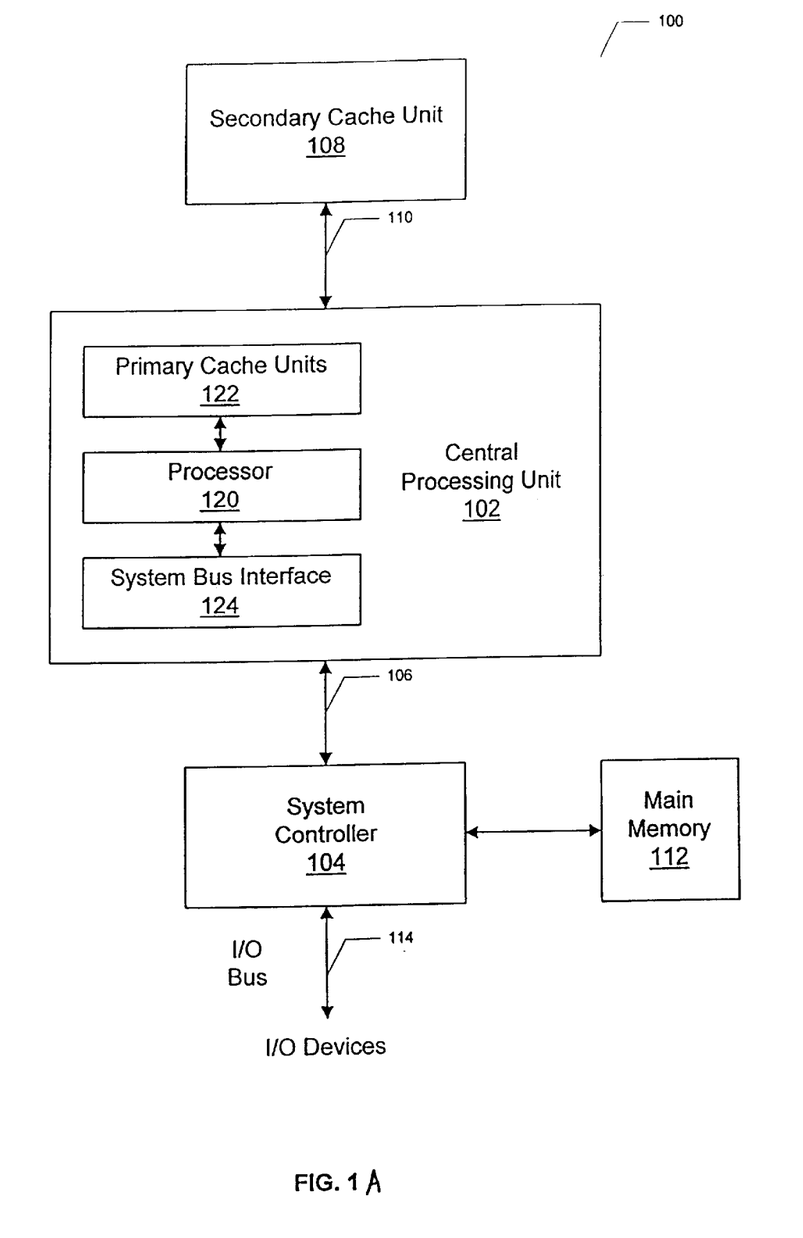

Referring to FIG. 1A, data processing system 100 includes central processing unit (CPU) 102. CPU 102 is coupled to system controller 104 via system bus 106 and is coupled to secondary cache 108, the secondary cache being coupled to CPU 102 via secondary cache bus 110. The system controller is coupled main memory 112 and is coupled to I/O devices through I/O bus 114. CPU 102 includes processor 120, the processor 120 being coupled primary cache 122 and includes system bus interface 124, the system bus interface 124 being coupled to the system bus 106. Processor 120 is also coupled through secondary cache bus 110 to secondary cache 108.

Figure 1B:
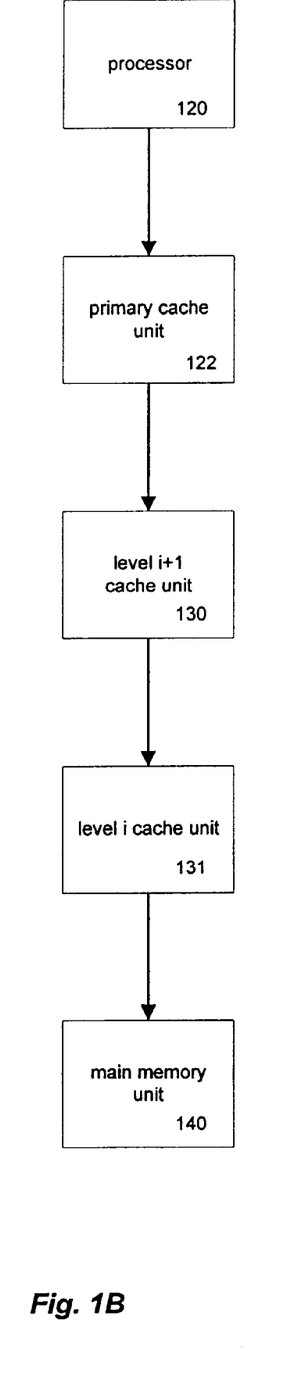
FIG. 1B illustrates the hierarchical structure of memory for the system of FIG. 1A.

Referring to FIG. 1B, the organization of a data processing system with a hierarchical memory system is shown. Processor 120 processes the data in the memory units. The highest order memory unit is the primary cache memory unit 122. This unit stores the data sets/lines with a high probability of having data of immediate use to the processor. The primary cache is sometimes referred to as the L0 cache or as the L1 cache. The next order cache is the secondary cache (not shown). When the data processing system has a multiplicity of caches and one of the caches is referred to as a level i+1 cache 130, then the next lower cache in the hierarchy is referred to as a level i cache 131. The lowest order memory component in the memory hierarchy is the main memory unit 140.

Figure 2:
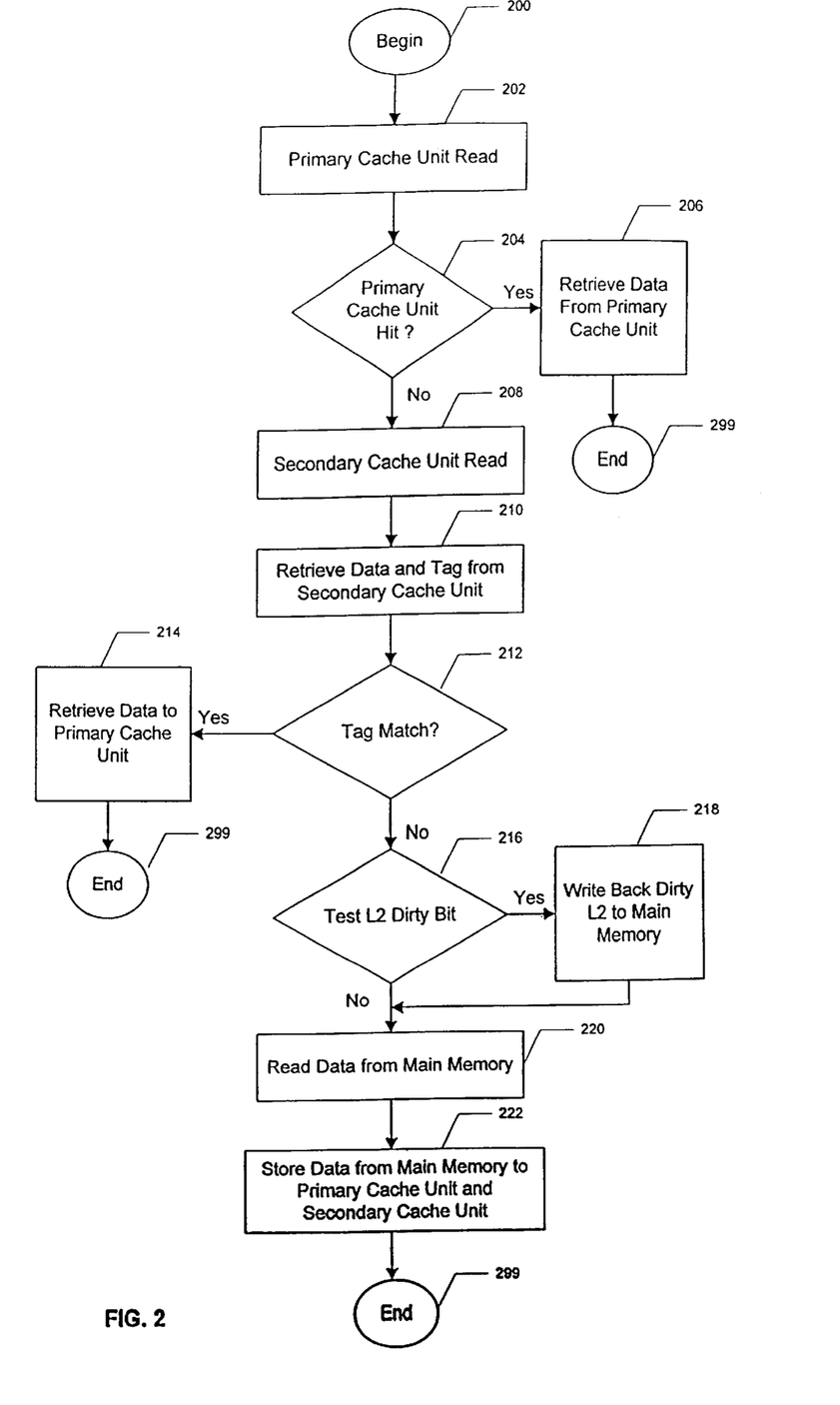
FIG. 2 is flow diagram of the activity of a two level cache data processing system for a write request operation when a data line address in the cache of a cache line address is available for a two level cache processing system.

Referring to FIG. 2, the procedure for implementing a write request instruction in the data processing system illustrated in FIG. 1 is shown. In this implementation, the space is available in the primary cache to store a data line. In step 202, CPU 102 issues a write request instruction. The primary cache is then interrogated in response to the write request instruction in step 204. After interrogation of the primary cache, a determination is made as to whether the address to which the data line to be written is found in the primary cache. This determination is expressed as a write address hit in step 206. When the address is found in the primary cache, then, in step 208, the data subject to the write request is stored in the data cache line address, ending the procedure. When the cache line address in not found in the primary cache in step 206, then the secondary cache is interrogated in step 210. The secondary cache is then interrogated to determine if the data associated with the write request instruction is found in the secondary cache. When the data associated with the write request is found in the secondary cache in step 212, then the data associated with the request is stored in the primary cache along with the data associated with the write request in step 214. In step 216, the cache line address associated with the write request is invalidated in step 216. When, in step 212, the address is not found in secondary cache, then the cache line is retrieved from the main memory and stored along with the subject data in the primary cache in step 218, ending the procedure. Storage in the primary cache is always accompanied by setting the dirty bit equal to i (not shown).

Figure 3:
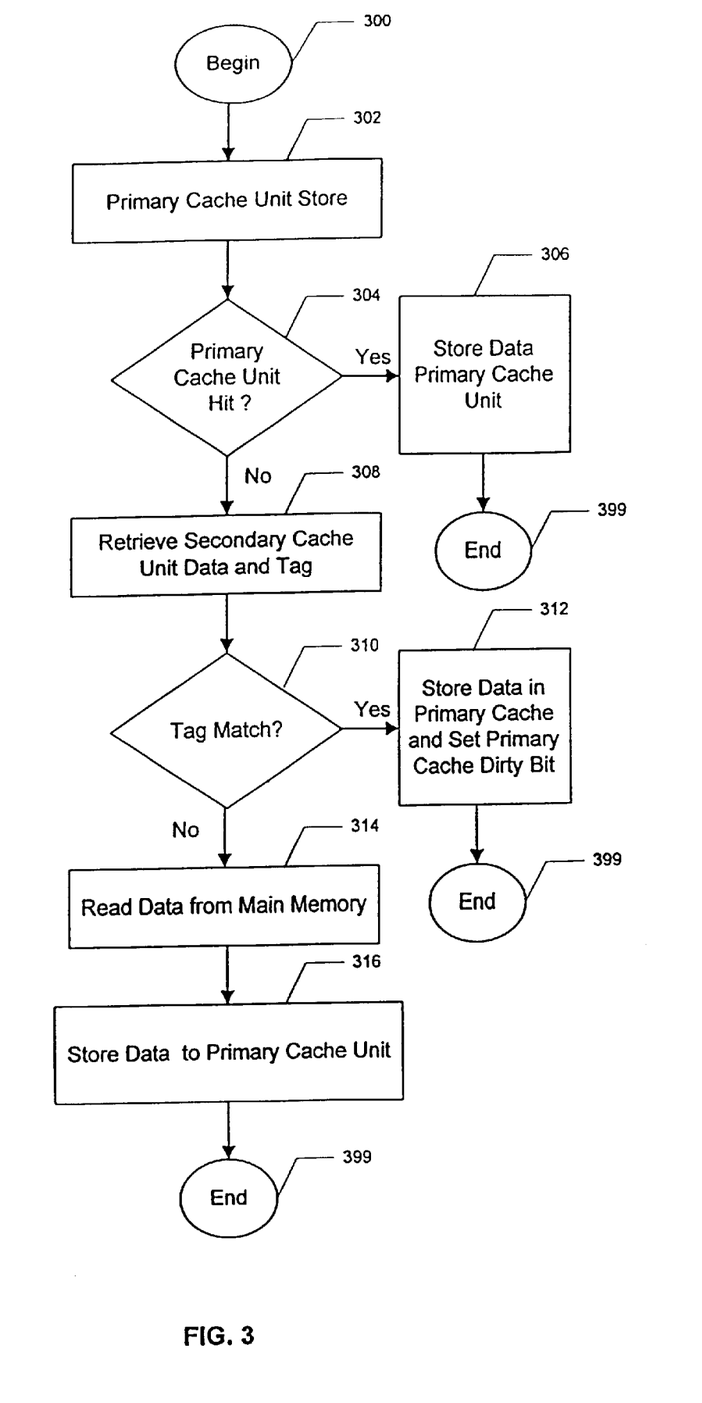
FIG. 3 is a flow diagram of the activity of a multi-level cache data processing system for a write request operation in which a primary cache line address is available for the storage of the write request data.

Referring to FIG. 3, the procedure shown in FIG. 2 is illustrated for the general ith level cache. In step 302, as a result of failure to find the data cache line address, the level i cache is interrogated in step 304. As a result of this interrogation, in step 304, a determination is made as to whether the data cache line address is present in the level i cache. When the data cache address is in the level i cache in step 304, then the data line at the data line address is stored in the primary cache. The address in which the data line address was stored is then invalidated in step 308, thereby completing the procedure. When, in step 304, the data line address is not found in the level i cache, then the procedure is repeated for the next lower level cache and the level i+1 cache is interrogated in step 310. The procedure continues until either the data line address is found in one of the lower level cache units or the main memory is accessed.

Figure 4:
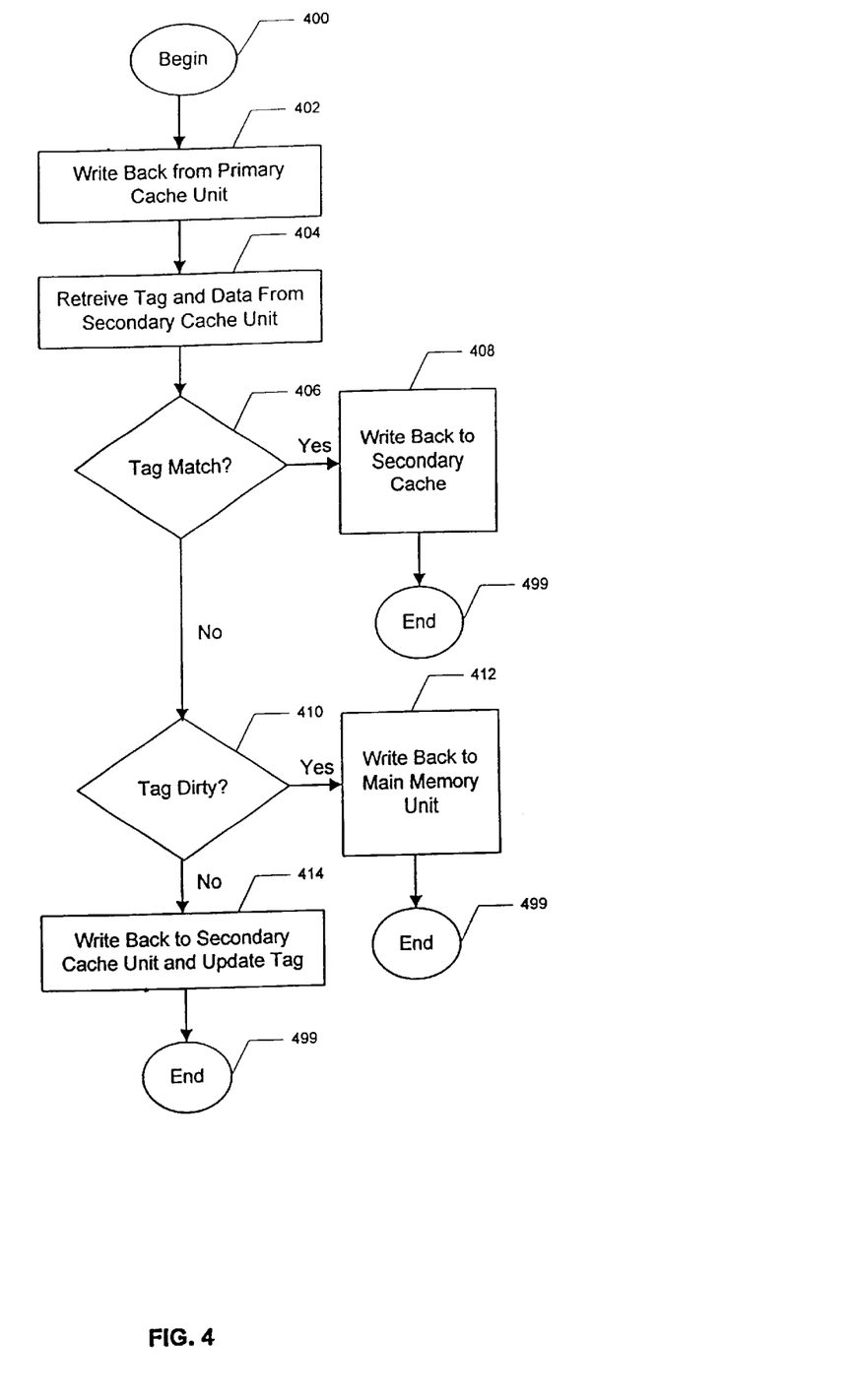
FIG. 4 is a flow diagram of the activity of a two level cache data processing system for a write request operation in which a data line address is not originally available for a storage of the associated data line address.

Referring to FIG. 4, a more complicated procedure for a write request instruction is shown in the primary/secondary cache embodiment. The complication arises because, in contrast to the procedures in FIGS. 2 and 3, no empty or invalid cache line as been found in the primary cache. Because an empty cache line (or line of invalid data) is not found, a cache line must be made available for the write information. To make an address available, a line of data will be moved from the primary cache to the secondary, or a lower order, cache.

In step 402 CPU 102 issues a write request for data associated with a data address. In step 404, the primary cache is interrogated. As a result of that interrogation, the determination is made whether the address associated with the data to be written resides in the primary cache in step 404. When the address of the data to be written is found in the primary cache in step 406, then the data is written in the primary cache in the data line address. The procedure ends at this point. When, however, the data line address is not found in the primary cache in step 406, then a determination is made as whether the a write back address is available in the primary cache in step 410. When a write back cache line is available in step 410, then the secondary cache is interrogated in step 412. In response to the interrogation of the secondary cache, a determination is made whether the data address associated with the write instruction is present in the secondary cache in step 414. When the data address associated with the write address is found in the secondary cache in step 414, then data line address is transferred to the primary cache and stored at the location determined by the available primary cache line. The address of the data line in the secondary cache that has been stored in the primary cache in then invalidated and the procedure is ended. When, in step 414, the data line address is not in the secondary cache, then the data line in the main memory is stored in the primary cache write back address location. The dirty bit associated write back cache line address is set. The procedure ends at this point. Referring back to step 410, when a write back line is not available in the primary cache, a write back line is selected in step 430. The procedure continues, in step 432, wherein the secondary cache is interrogated. Based on the interrogation in step 432, a determination is made whether the data line address in the secondary cache. When the data address is found to be in the secondary cache, then the secondary cache line is sent to the primary cache and is stored in the primary cache in step 436. In step 438, the data address line in the secondary cache is invalidated. In step 440, a determination is made whether the write back address is in the secondary cache. When the write back address is found in the secondary cache, then the write back cache line is stored at that address in the secondary cache in step 442. In step 444, the dirty bit is set equal to 1 and the procedure ends. When is step 440, the write back line address is not found in the secondary cache, then the write back cache line is written into the write back line address in main memory in step 446. Returning to step 434, when the data address is not found in the secondary cache, the determination is made as to whether the secondary cache includes the write back address in step 450. When the write back address is found in the secondary cache, the write back line is written at that address in the secondary cache in step 452. In step 454, the invalid bit is set at the write back address in the secondary cache. The data line at the data line address in the main memory is transferred to the primary cache in step 456. When the write back address is not found in the secondary cache in step 450, a victim line is selected for the secondary cache in step 458. In step 460, a determination is made as to whether the victim line has an active dirty bit. When the dirty bit is not active in step 460, the procedure is transferred to step 452 and the procedure implements this and the succeeding steps. When, in step 460, the dirty bit is set, then the write back line is stored in the main memory in step in step 462. In step 464, the data cache line is retrieved from the main memory and stored in the primary cache.

Figure 5:
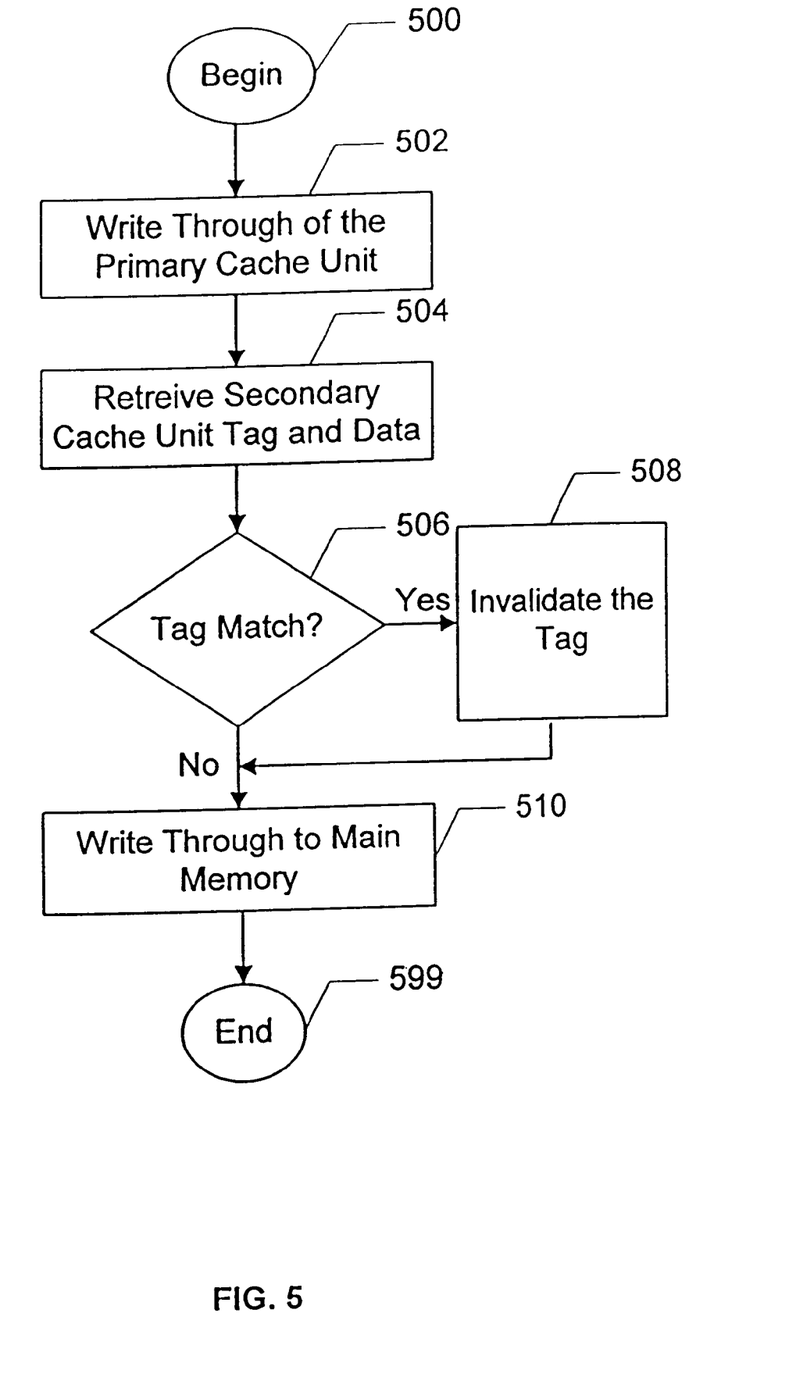
FIG. 5 is a flow diagram of the activity of a multi-level cache data processing system for a write request operation in which the a data line address is not originally available for storage of the data line associated with the write request.
Figure 6:
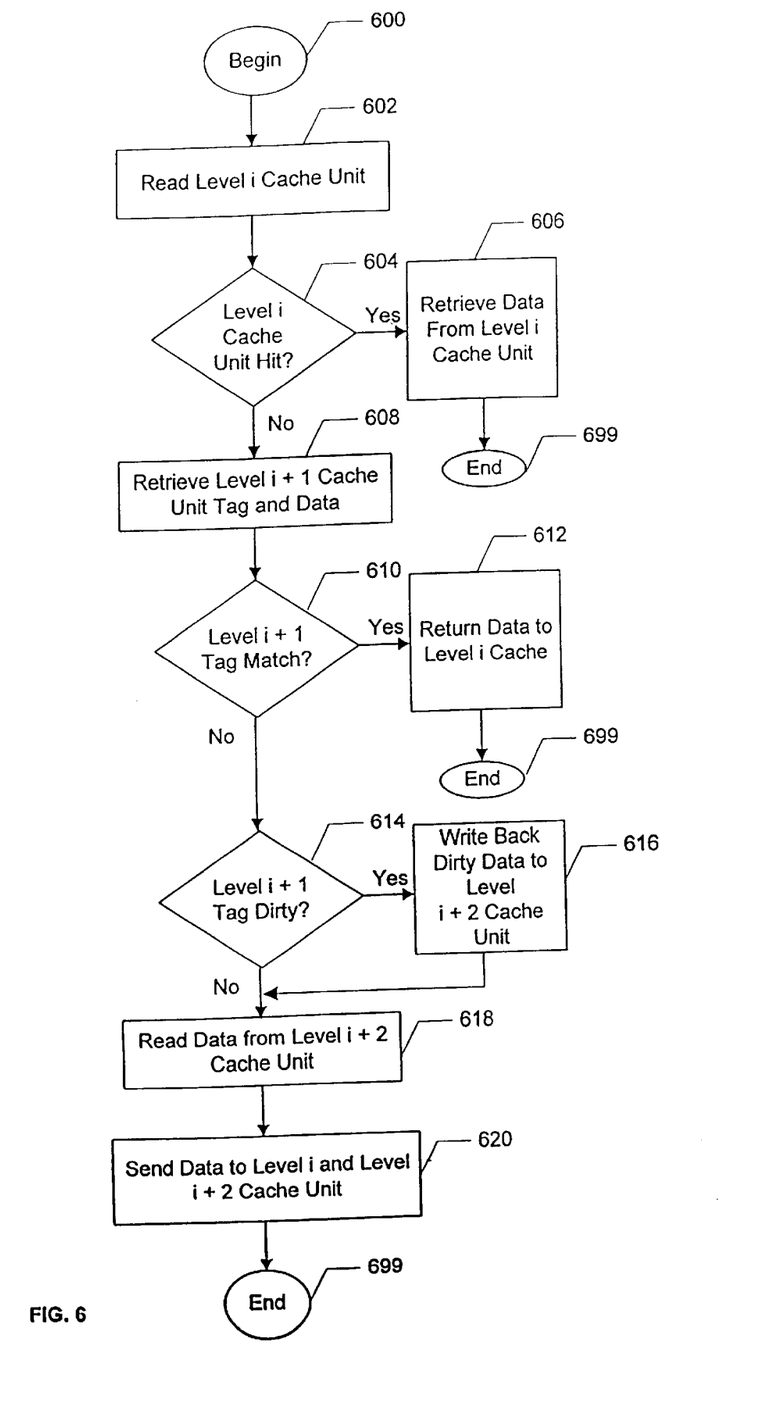
FIG. 6 is a flow chart of the activity of a data processing system when a miss occurs for a read operation involving a level i cache according to the present invention.
Figure 7:
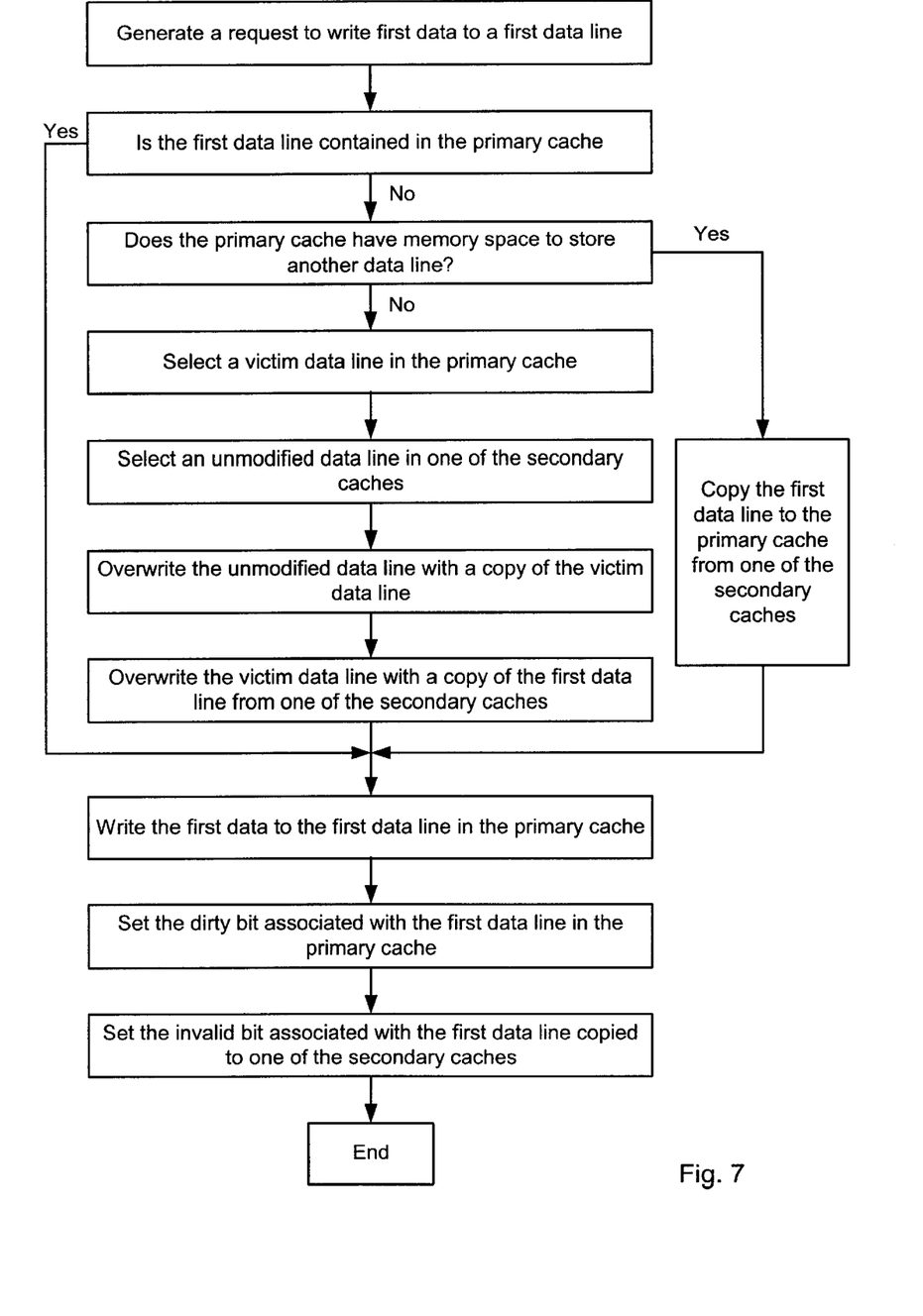
FIG. 7 is a flow chart illustrating relevant aspects of one embodiment of the present invention.

Referring now to FIG. 5, the write miss instruction is shown for the level i cache. In step 502, the data address that is the subject of the write request has not been found in the level i–1 cache, and the write back address has not been retired in the previous caches. In step 504, the level i cache is interrogated. Based on the interrogation in step 504, a determination is made, in step 506, as to whether the data address on the write request is in the level i cache. When the data address is found in the level i cache, the data line is transferred to the primary cache in step 508. In step 510, the data line in the level i cache that was accesses in the previous step is invalidated. In step 512, a determination is made as to whether the write back address is present in the level i cache. When the write back address is located in the level i cache, then the write back line is stored at the write back address in the level i cache in step 514. In step 516, the write back address line in the level i cache has the dirty bit activated in step 516. Step 516 ends the procedure. When, in step 512, the write back address is not found in level i cache, a replacement line is selected in the step 518 using the appropriate replacement algorithm. In step 520, a determination is made whether the dirty bit associated with the replacement line in set, i.e., =1. When the dirty bit associated with the replacement line is not set, then the write back line is written into the placement line address in step 514. The procedure continues from step 514. When the dirty bit associated with the replacement line is set, then, in step 522, the write back storage request is forwarded to the level i+1 cache and the procedure is continued. When, in step 506, the data address is not found in the level i cache, then a determination is made, in step 530, whether the write back address is present in the level i cache. When the write address is found in the level i cache, the write back data line in written into that address in step 532. Next the dirty bit is set for the write back address in the level i cache in step 534. In step 536, the write request is forwarded to the level i+1 cache and the procedure is continued. When the write back address is not found in the level i cache in step 530, a replacement line is selected in step 540. In step 544, a determination is made as to whether the dirty bit associated with the replacement line is set. When the dirty bit associated with the replacement line is not set, then the procedure goes to step 532 wherein the write back line is written into the replacement line address. The procedure thereafter continues from step 532. When the dirty bit associated with the replacement line has been set in step 542, then the write request and the write back request are forwarded to the level i+1 cache in step 544.

Operation of an Embodiment

The strategy for the-cache memory units is to make the data groups that have the highest likelihood of success most accessible to the data processing system. For example, because the programming of processing units attempts to use as small a distance as possible between consecutive data groups required by the CPU, the use of multi-group data lines in the addressing scheme increases the likelihood that the next required data group will be stored in the cache memory (as well as having the advantage of reducing the address field length). Because of this strategy, the write request data and the data line associated therewith should be stored in the primary cache. Two complications arise from the strategy to store the write request data in the primary cache. First, the data associated with the write request is only one data set in a group of data sets of the data line in which includes the address of the data set associated with the write request. Therefore, the primary cache must store the data set in a data line for which the write request data set is only one component. In addition, in the preferred embodiment of the data processing system, multiple copies of the data line may be present in the cache hierarchy. In the present implementation, the main memory may not have the most recent update of a data line. In the present invention, when the address of the write request data set is found in the primary cache, the write request data set is stored in the primary cache and the dirty bit is set. Therefore, the most recent updata of the data line is available to the processor in the primary cache. When the data line associated with the write request is not in the primary cache, but a primary location is available to store the data line, the data line associated with the write request is sought sequentially in the cache hierarchy and main memory. When the data line is (first) found, the data line is transferred to the primary cache and the write request data set is incorporated in the data line. When the data line is transferred from a cache, that data line is invalidated in the originating cache. In addition, in the primary cache, the dirty bit associated with the data line is set, the data line having been updated by inclusion of the write request data.

The final possibility for the write request operation is that, not only is the data line associated with the write request not available in the primary cache, but no location is currently available to store the associated data line. In this situation, a data line in the primary cache is selected by the replacement algorithm and that line is written back in the cache hierarchy to a lower order cache having an unmodified data line. The data line associated with the write request is found in the cache/main memory hierarchy and stored in the primary cache in the location from which the data line was removed. In this manner, the latest data set from the processor is stored in the primary cache.

Those skilled in the art will readily implement the steps necessary to provide the structures and the methods disclosed herein, and will understand that the process parameters, materials, dimensions, and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

What is claimed is:

1. A method comprising:

generating a request to write first data to a first data line;

selecting a victim data line in a primary cache in response to a determination that the first data line is not contained in the primary cache and in response to a determination that the primary cache lacks memory space to store another data line;

selecting an unmodified data line in one of a plurality of secondary caches;

overwriting the unmodified data line in the one of the plurality secondary caches with a copy of the victim line selected in the primary cache;

overwriting the victim data line in the primary cache with a copy of the first data line contained in the one or another of the plurality of secondary caches;

setting a dirty bit associated with the first data line in the primary cache after the victim data line in the primary cache is overwritten with the copy of the first data line;

setting an invalid bit associated with the first data line contained in the one or another of the plurality of secondary caches.

2. The method of claim 1 wherein the victim line is randomly selected.

3. The method of claim 1 wherein the victim line is selected according to least recently used (LRU) algorithm.

4. A computer readable memory medium storing instructions executable by a computer system comprising a primary cache, a plurality of secondary caches, and a main memory, wherein the computer system performs a method in response to the computer system executing the instructions, the method comprising:

generating a request to access a first data line;

selecting a victim data line in the primary cache in response to a determination that the first data line is not contained in the primary cache and in response to a determination that the primary cache lacks memory space to store another data line;

selecting an unmodified data line in one of the plurality of secondary caches;

overwriting the unmodified data line in the one of the plurality secondary caches with a copy of the victim line selected in the primary cache;

overwriting the victim data line in the primary cache with a copy of the first data line contained in the one or another of the plurality of secondary caches;

setting a dirty bit associated with the first data line in the primary cache after the victim data line in the primary cache is overwritten with the copy of the first data line;

setting an invalid bit associated with the first data line contained in the one or another of the plurality of secondary caches.

5. The computer readable memory medium of claim 4 wherein the victim line is randomly selected.

6. The computer readable memory medium of claim 4 wherein the victim line is selected according to least recently used (LRU) algorithm.

7. An apparatus comprising:

a processor;

a primary cache;

a plurality of secondary caches;

wherein the processor is coupled to the primary cache and the plurality of secondary caches;

wherein the processor is configured to generate a request to access a first data line;

wherein the processor is configured to select a victim data line in the primary cache in response to a determination that the first data line is not contained in the primary cache and in response to a determination that the primary cache lacks memory space to store another data line;

wherein the processor is configured to select an unmodified data line in one of the plurality of secondary caches;

wherein the processor is configured to overwrite the unmodified data line in the one of the plurality secondary caches with a copy of the victim line selected in the primary cache;

wherein the processor is configured to overwrite the victim data line in the primary cache with a copy of the first data line contained in the one or another of the plurality of secondary caches;

wherein the processor is configured to set a dirty bit associated with the first data line in the primary cache after the victim data line in the primary cache is overwritten with the copy of the first data line;

wherein the processor is configured to set an invalid bit associated with the first data line contained in the one or another of the plurality of secondary caches.

* * * * *